United States Patent
Han

(10) Patent No.: US 8,323,145 B2
(45) Date of Patent: Dec. 4, 2012

(54) HYBRID POWERTRAIN OPTIMUM RATIO SELECTION

(75) Inventor: Ed E. Han, Ann Arbor, MI (US)

(73) Assignee: GM Global Technology Operations LLC

( * ) Notice: Subject to any disclaimer, the term of this patent is extended or adjusted under 35 U.S.C. 154(b) by 1702 days.

(21) Appl. No.: 11/391,795

(22) Filed: Mar. 29, 2006

(65) Prior Publication Data

US 2007/0232440 A1  Oct. 4, 2007

(51) Int. Cl.
*B60W 10/08* (2006.01)
(52) U.S. Cl. .......................................................... 477/3
(58) Field of Classification Search ..................... None
See application file for complete search history.

(56) References Cited

U.S. PATENT DOCUMENTS

| 5,903,061 | A  | * | 5/1999  | Tsuzuki et al. ............ 290/40 C |
| 6,646,419 | B1 |   | 11/2003 | Ying |
| 2004/0152558 | A1 | * | 8/2004 | Takami et al. .................... 477/3 |

FOREIGN PATENT DOCUMENTS

| DE | 10007136 | 9/2000 |
| DE | 102004040315 | 3/2006 |

OTHER PUBLICATIONS

U.S. Appl. No. 11/031,197, filed Jan. 7, 2005.

* cited by examiner

*Primary Examiner* — Edwin A Young

(57) ABSTRACT

A transmission control system for a hybrid electric vehicle including an electric machine includes an energy storage device that is selectively charged by the electric machine and that selectively powers the electric machine. A driver input device generates a driver input signal. A control module receives the driver input signal, determines a torque load of the electric machine based on a state of charge (SOC) of the energy storage device and determines a transmission ratio based on the torque load and the driver input signal.

20 Claims, 2 Drawing Sheets

HYBRID POWERTRAIN OPTIMUM RATIO SELECTION

FIELD OF THE INVENTION

The present invention relates to transmission control, and more particularly to selecting a transmission ratio of a hybrid powertrain based on a state of the hybrid powertrain.

BACKGROUND OF THE INVENTION

Internal combustion engines produce drive torque that is transferred to a drivetrain. The drive torque is transferred through a transmission that multiplies the drive torque by a gear ratio. Transmissions generally include multiple gear ratios through which the drive torque is transferred. Automatic transmissions automatically shift between gear ratios based on driver input and vehicle operating conditions. Hybrid powertrains typically include an electric machine and an energy storage device (ESD). In one mode, the electric machine drives the transmission using energy stored in the ESD. In another mode, the electric machine is driven by the engine to charge the ESD.

Traditional transmission control systems determine shift decisions based on vehicle speed and throttle. The shift strategy is developed based on vehicle performance, drivability and fuel economy based on anticipated driving conditions. The shift strategy also must account for engine sub-systems (e.g., variable valve timing (VVT)) and other features including, but not limited to, powertrain braking, GPS-based shifting and hybrid vehicle functions. In a hybrid powertrain, the shift control strategy must also account for electrical requirements (i.e., driving or powering the electric machine). As a result, transmission control systems, those for hybrid powertrains in particular, are more complex than desired and require significant time to calibrate.

SUMMARY OF THE INVENTION

Accordingly, the present invention provides a transmission control system for a hybrid electric vehicle including an electric machine. The transmission control system includes an energy storage device that is selectively charged by the electric machine and that selectively powers the electric machine. A driver input device generates a driver input signal. A control module receives the driver input signal, determines a torque load of the electric machine based on a state of charge (SOC) of the energy storage device and determines a transmission ratio based on the torque load and the driver input signal.

In other features, the control module determines the torque load based on an electrical load grade. The electrical load grade is determined based on a vehicle speed and a charge power. The charge power is determined based on the SOC.

In another feature, the control module determines an acceleration reserve for the transmission ratio and commands an up-shift in the transmission ratio when the acceleration reserve is greater than an up-shift acceleration threshold.

In still another feature, the control module determines an acceleration reserve for the transmission ratio and commands a down-shift in the transmission ratio when the acceleration reserve is greater than a down-shift acceleration threshold.

In yet another feature, the control module determines an engine capable acceleration, commands an up-shift when the engine capable acceleration is greater than an up-shift threshold and commands a down-shift when the engine capable acceleration is less than a down-shift threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
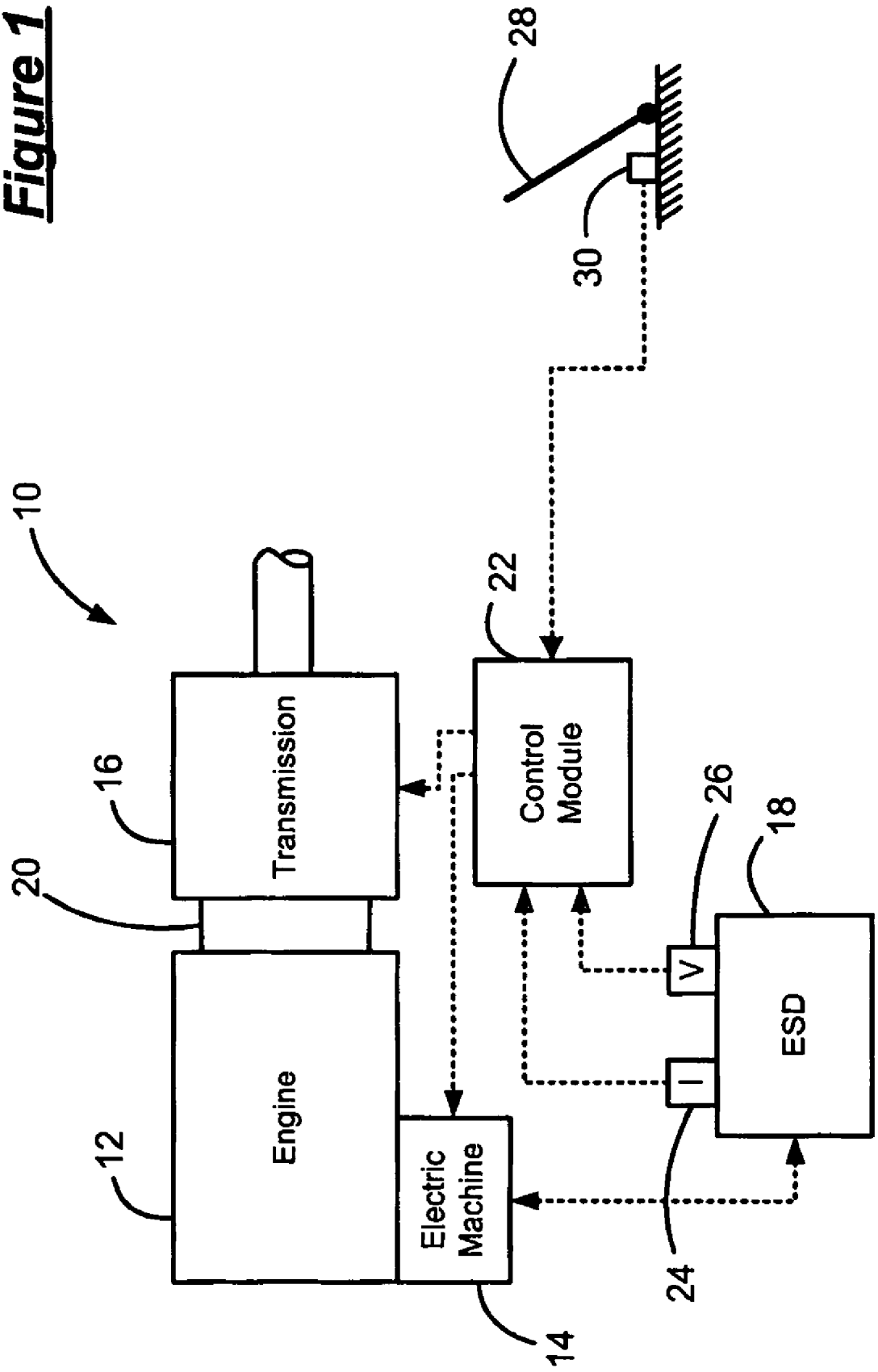
FIG. 1 is a schematic illustration of an exemplary hybrid vehicle that is operated based on the transmission control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary hybrid vehicle 10 is schematically illustrated. The hybrid vehicle 10 includes an engine 12 and an electric machine 14, which selectively drive a transmission 16. More specifically, the electric machine 14 supplements the engine 12 to produce drive torque to drive the transmission 16. In this manner, fuel efficiency is increased and emissions are reduced. In one mode, the engine 12 drives the electric machine 14 to generate power used to recharge an energy storage device (ESD) 18, such as a battery. In another mode, the electric machine 14 drives the transmission 16 using energy from the ESD 18.

The engine 12 and the electric machine 14 can be coupled via a belt-alternator-starter (BAS) system (not shown) that includes a belt and pulleys. Alternatively, the engine 12 and the electric machine 14 can be coupled via a flywheel-alternator-starter (FAS) system (not shown), wherein the electric machine 14 is operably disposed between the engine 12 and the transmission 16. It is anticipated that other systems can be implemented to couple the engine 12 and the electric machine 14 including, but not limited to, a chain or gear system that is implemented between the electric machine 14 and a crankshaft.

The transmission 16 can include, but is not limited to, a continuously variable transmission (CVT), a manual transmission, an automatic transmission and an automated manual transmission (AMT). Drive torque is transferred from the engine 12 to the transmission 16 through a coupling device 20. The coupling device 20 can include, but is not limited to, a friction clutch or a torque converter depending upon the type of transmission implemented. In the case of a CVT, the coupling device 20 includes a torque converter and a torque converter clutch (TCC). The transmission 16 multiplies the drive torque through one of a plurality of gear ratios to drive a vehicle driveline (not shown).

A control module 22 regulates operation of the vehicle 10 based on the transmission control system of the present invention. A current sensor 24 generates a current signal that is sent to the control module 22 and a voltage sensor 26 generates a battery voltage signal that is sent to the control module 22. The control module 22 determines a state of charge (SOC) of the ESD 18 based on the current and voltage signals. There are several methods that can be implemented to determine the SOC. An exemplary method is disclosed in commonly assigned U.S. Pat. No. 6,646,419, issued on Nov. 11, 2003 and entitled State of Charge Algorithm for Lead-Acid Battery in a Hybrid Electric Vehicle, the disclosure of which is expressly incorporated herein by reference. An accelerator pedal 28 is provided and enables a driver to indicate a desired engine torque output ($T_{DES}$). More specifically, a position sensor 30 is responsive to a position of the accelerator pedal 28. The position sensor 30 generates a position signal that indicates the desired engine torque output. The control module 34 generates shift signals (i.e., up-shift, down-shift) based on the driver input.

The transmission control system of the present invention accounts for drive/charge torque ($T_{EM}$) of the electric machine 14 in determining an optimum transmission ratio. For example, if the ESD 18 requires charging, a transmission ratio is required to enable driving of the electric machine 14, as well as the remainder of the vehicle powertrain. If the electric machine 14 is assisting the engine 12 or supplementing the engine 12, a different transmission ratio optimizes the powertrain efficiency. The transmission control system of the present invention functions similar to the transmission control system disclosed in commonly assigned U.S. patent application Ser. No. 11/031,397, entitled Selecting Transmission Ratio Based on Performance Drivability and Fuel Economy, and filed on Jan. 7, 2005, disclosure of which is expressly incorporated herein by reference.

An optimum SOC profile is derived for multiple driving schedules. The optimum SOC profiles are derived using optimization techniques including, but not limited to, dynamic programming. A transfer function from SOC to an associated moving average charge power ($P_{SOC}$) is developed by analyzing the portion of vehicle energy being converted to charge the ESD 18. A negative $P_{SOC}$ indicates electrical driving (i.e., the electric machine 14 assisting or supplementing the engine 12). The transfer-function can be provided as a look-up table that provides $P_{SOC}$ for a given SOC.

The transmission control system calculates an electrical load grade (N) based on $P_{SOC}$ and velocity ($V_{VEH}$). More specifically, N is calculated based on the following equation:

$$N=1000(P_{SOC})/V$$

where 1000 is a conversion constant. If the engine 12 is off or at low speed (e.g., less than 1000 RPM) for electrical driving, N can be defaulted to 0. At any given V, N can be calculated as an equivalent grade force (e.g., torque at the wheel) ($T_{EL}$) based on the following equation:

$$T_{EL}=(N)*(r_{LOAD})$$

where $r_{LOAD}$ is the loading radius of the wheel. $T_{EL}$ accounts for the electrical load requirements when determining the required wheel torque ($T_{WHEEL}$). More specifically, $T_{WHEEL}$ is determined based on $T_{DES}$, torque loss as a result of drag ($T_{DRAG}$), torque loss as a result of general frictional and efficiency losses ($T_{LOSS}$), and $T_{EL}$.

An acceleration reserve ($a_{RES}$) is the additional vehicle acceleration, beyond what is commanded by the driver, that the powertrain is capable of delivering without a gear shift. $a_{RES}$ is determined as the difference between the maximum acceleration ($a_{MAX}$) for the current gear ratio and a driver requested acceleration ($a_{REQ}$). $a_{RES}$ is compared to an up-shift threshold ($a_{RESU/STHR}$) and a down-shift threshold ($a_{RESD/STHR}$) to determine whether an up-shift or a down-shift is to occur. $a_{RESU/STHR}$ and $a_{RESD/STHR}$ are determined from a look-up table based on vehicle speed and accelerator pedal position. When multiple gear ratios meet $a_{RESU/STHR}$, the gear that consumes the least amount of fuel will be selected. However, if the current $a_{RES}$ is less than $a_{RESD/STHR}$, the gear that consumes the least amount of fuel and that would yield an $a_{RES}$ that is closest to zero will be selected.

In order to achieve the optimum SOC profile and avoid busyness (i.e., rapid switching between ratios), an engine capable acceleration ($a_{ECAP}$) for the current road load and electrical grade load is compared to an up-shift acceleration threshold ($a_{ECAPU/S}$). More specifically, if $a_{ECAP}$ is greater than $a_{ECAPU/S}$, an up-shift is enabled. $a_{ECAPU/S}$ can be determined from a look-up table based on vehicle speed and the moving-average road load. Alternatively if $a_{ECAP}$ is less than a down-shift acceleration threshold ($a_{ECAPD/S}$), a down-shift is commanded regardless of $a_{RES}$. It is anticipated, however, that a brief excursion at $a_{ECAP}$ can be allowed before the down-shift is commanded. The duration of the excursion can be determined from a look-up table based on the vehicle speed and $T_{DES}$.

Figure 2:
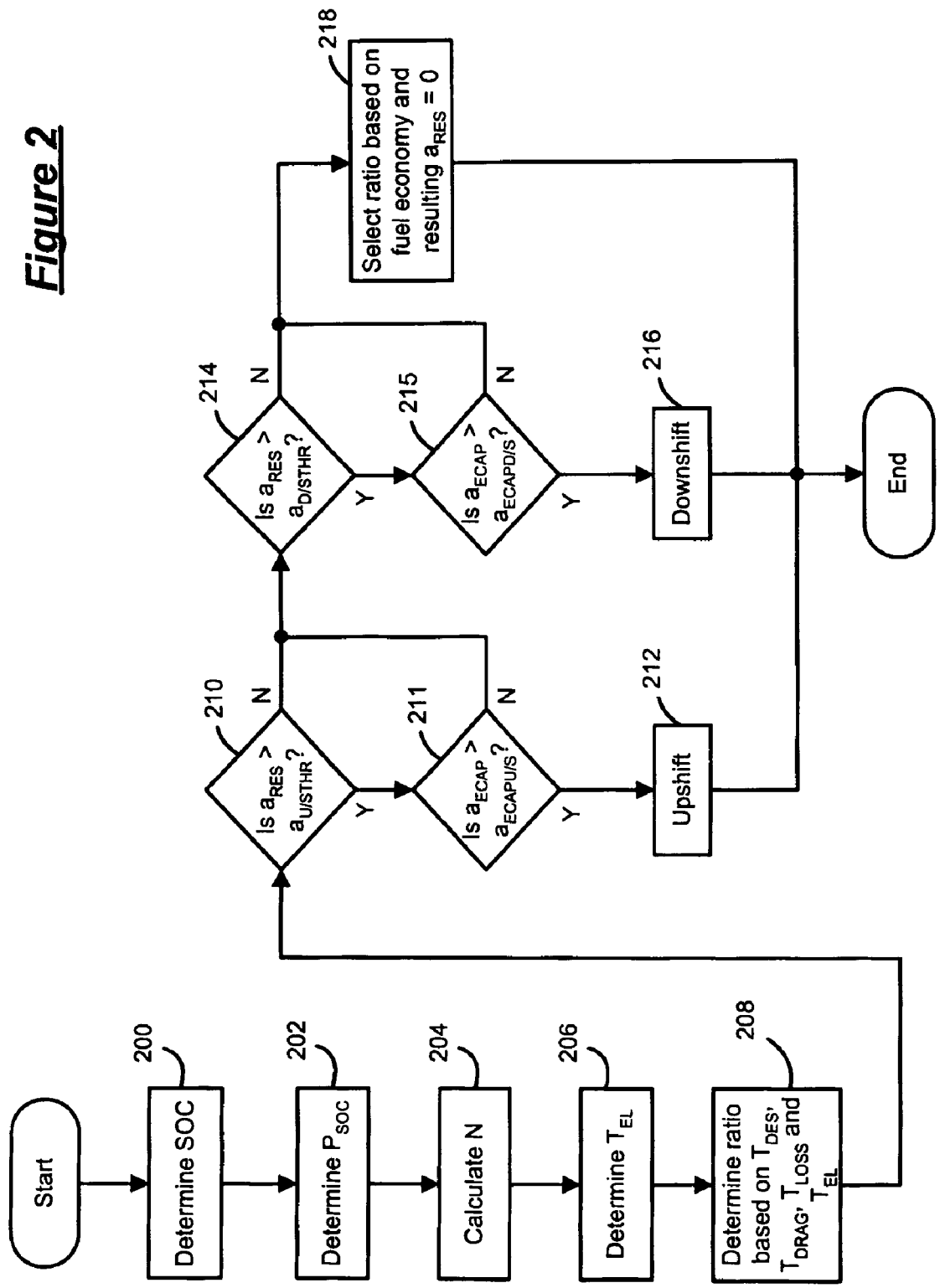
FIG. 2 is a flowchart illustrating steps performed by the transmission control system of the present invention to determine an optimum transmission ratio.

Referring now to FIG. 2, the steps executed by the transmission control system will be described in detail. In step 200, control determines SOC. In step 202, control determines $P_{SOC}$. Control calculates N based on $P_{SOC}$ and $V_{VEH}$ in step 204. In step 206, control determines $T_{EL}$ based on N and $r_{LOAD}$. Control determines the transmission ratio based on $T_{DES}$, $T_{DRAG}$, $T_{LOSS}$ and $T_{EL}$ in step 208.

In step 210, control determines whether $a_{RES}$ is greater than an up-shift threshold ($a_{U/STHR}$). If $a_{RES}$ is greater than an $a_{U/STHR}$, control up-shifts the transmission in step 212 and ends. If $a_{RES}$ is not greater than an $a_{U/STHR}$, control determines whether $a_{RES}$ is greater than a down-shift threshold ($a_{D/STHR}$) in step 214. If $a_{RES}$ is greater than $a_{D/STHR}$, control down-shifts the transmission in step 216 and ends. If $a_{RES}$ is not greater than $a_{D/STHR}$, control determines the ratio based on fuel economy and setting $a_{RES}$ equal to zero in step 218 and control ends.

The transmission control system of the present invention determines an optimum gear ratio that is capable of supplying sufficient energy for both vehicle load (i.e., torque to drive vehicle) and electrical load (i.e., torque to drive the electric machine). The electric motor torque is used to satisfy instant driver command and load conditions. The charge torque (i.e., $T_{EL}$) is optimized to achieve $P_{SOC}$ within engine reserve capacity to achieve maximum engine efficiency (i.e., fuel economy) at the selected transmission ratio.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A transmission control system for a hybrid electric vehicle including an electric machine, comprising:
   an energy storage device that is selectively charged by said electric machine and that selectively powers said electric machine;
   a driver input device that generates a driver input signal; and a control module that receives said driver input signal, that determines a torque load of said electric machine based on a state of charge (SOC) of said energy storage device and that determines a transmission ratio based on said torque load and said driver input signal.

2. The transmission control system of claim 1 wherein said control module determines said torque load based on an electrical load grade.

3. The transmission control system of claim 2 wherein said electrical load grade is determined based on a vehicle speed and a charge power.

4. The transmission control system of claim 3 wherein said charge power is determined based on said SOC.

5. The transmission control system of claim 1 wherein said control module determines an acceleration reserve for said transmission ratio and commands an up-shift in said transmission ratio when said acceleration reserve is greater than an up-shift acceleration threshold.

6. The transmission control system of claim 1 wherein said control module determines an acceleration reserve for said transmission ratio and commands a down-shift in said transmission ratio when said acceleration reserve is greater than a down-shift acceleration threshold.

7. A transmission control system for a hybrid electric vehicle including an electric machine, comprising:
an energy storage device that is selectively charged by said electric machine and that selectively powers said electric machine;
a driver input device that generates a driver input signal; and
a control module that receives said driver input signal, determines a torque load of said electric machine based on a state of charge (SOC) of said energy storage device, determines a transmission ratio based on said torque load and said driver input signal, determines an engine capable acceleration, commands an up-shift when said engine capable acceleration is greater than an up-shift threshold and commands a down-shift when said engine capable acceleration is less than a down-shift threshold.

8. A method of selecting a transmission ratio in an electric hybrid vehicle including an electric machine, comprising:
generating a desired torque command;
calculating a state of charge (SOC) of an energy storage device;
determining a torque load of said electric machine based on said SOC; and
selecting said transmission ratio based on said torque load and said desired torque command.

9. The method of claim 8 further comprising determining said torque load based on an electrical load grade.

10. The method of claim 9 further comprising determining said electrical load grade based on a vehicle speed and a charge power.

11. The method of claim 10 further comprising determining said charge power based on said SOC.

12. The method of claim 8 further comprising:
calculating an acceleration reserve for said transmission ratio; and
commanding an up-shift in said transmission ratio when said acceleration reserve is greater than an up-shift acceleration threshold.

13. The method of claim 8 further comprising:
calculating an acceleration reserve for said transmission ratio; and
commanding a down-shift in said transmission ratio when said acceleration reserve is greater than a down-shift acceleration threshold.

14. A method of selecting a transmission ratio in an electric hybrid vehicle including an electric machine, comprising:
generating a desired torque command;
calculating a state of charge (SOC) of an energy storage device;
determining a torque load of said electric machine based on said SOC;
selecting said transmission ratio based on said torque load and said desired torque command;
calculating an engine capable acceleration;
commanding an up-shift when said engine capable acceleration is greater than an up-shift threshold; and
commanding a down-shift when said engine capable acceleration is less than a down-shift threshold.

15. A method of selecting a transmission ratio in an electric hybrid vehicle including an electric machine, comprising:
generating a desired torque command;
calculating a state of charge (SOC) of an energy storage device;
determining a charge power based on said SOC and a transfer function that correlates said charge power to said SOC;
determining a torque load of said electric machine based on said charge power; and
selecting said transmission ratio based on said torque load and said desired torque command.

16. The method of claim 15 further comprising determining said torque load based on an electrical load grade.

17. The method of claim 16 further comprising determining said electrical load grade based on a vehicle speed and the charge power.

18. The method of claim 15 further comprising:
calculating an acceleration reserve for said transmission ratio; and
commanding an up-shift in said transmission ratio when said acceleration reserve is greater than an up-shift acceleration threshold.

19. The method of claim 15 further comprising:
calculating an acceleration reserve for said transmission ratio; and
commanding a down-shift in said transmission ratio when said acceleration reserve is greater than a down-shift acceleration threshold.

20. A method of selecting a transmission ratio in an electric hybrid vehicle including an electric machine, comprising:
generating a desired torque command;
calculating a state of charge (SOC) of an energy storage device;
determining a charge power based on said SOC and a transfer function that correlates said charge power to said SOC;
determining a torque load of said electric machine based on said charge power;
selecting said transmission ratio based on said torque load and said desired torque command
calculating an engine capable acceleration;
commanding an up-shift when said engine capable acceleration is greater than an up-shift threshold; and
commanding a down-shift when said engine capable acceleration is less than a down-shift threshold.

* * * * *